(12) United States Patent
Becker et al.

(10) Patent No.: US 7,156,312 B2
(45) Date of Patent: Jan. 2, 2007

(54) RFID TAG HAVING MULTIPLE TRANSCEIVERS

(75) Inventors: Robert C. Becker, Eden Prairie, MN (US); David W. Meyers, Brooklyn Park, MN (US); Sabera Kazi, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/726,367

(22) Filed: Dec. 3, 2003

(65) Prior Publication Data

US 2004/0074976 A1 Apr. 22, 2004

Related U.S. Application Data

(62) Division of application No. 10/235,564, filed on Sep. 5, 2002, now Pat. No. 6,726,099.

(51) Int. Cl.
*G06K 19/06* (2006.01)

(52) U.S. Cl. ........................ 235/492; 235/451

(58) Field of Classification Search ............ 235/379, 235/380, 451, 492, 487, 385; 340/10.31, 340/0.2, 825.54, 825.34, 825.31, 10.1–10.4
See application file for complete search history.

(56) References Cited

U.S. PATENT DOCUMENTS

| | | | |
|---|---|---|---|
| 5,151,684 A | 9/1992 | Johnsen | |
| 5,305,199 A | 4/1994 | LoBiondo et al. | |
| 5,319,544 A | 6/1994 | Schmerer et al. | |
| 5,469,142 A | 11/1995 | Bergman et al. | |
| 5,485,520 A * | 1/1996 | Chaum et al. | ............ 705/74 |
| 5,515,053 A | 5/1996 | Hecht et al. | |
| 5,533,079 A | 7/1996 | Colburn et al. | |
| 5,539,775 A | 7/1996 | Tuttle et al. | |
| 5,591,951 A | 1/1997 | Doty | |
| 5,671,362 A | 9/1997 | Cowe et al. | |
| 5,741,985 A | 4/1998 | Gaete | |
| 5,777,884 A | 7/1998 | Belka et al. | |
| 5,781,004 A | 7/1998 | Gaete | |
| 5,841,770 A | 11/1998 | Snodgrass et al. | |
| 5,842,118 A | 11/1998 | Wood, Jr. | |
| 5,949,335 A | 9/1999 | Maynard | |

(Continued)

FOREIGN PATENT DOCUMENTS

EP 0 702 323 A2 3/1996

(Continued)

*Primary Examiner*—Kimberly D. Nguyen
(74) *Attorney, Agent, or Firm*—Andrew Abeyta, Esq.; Armstrong Teasdale LLP (57) ABSTRACT

Information is communicated between an RFID tag and first and second readers. A first transceiver of the RFID tag is controlled so that the first transceiver communicates with the first reader and so that the first transceiver has substantially longer periods during which the first transceiver is not in communication with the first reader than when the first transceiver is in communication with the first reader. A second transceiver of the RFID tag is controlled so that the second transceiver communicates with the second reader at least during the periods when the first transceiver is not in communication with the first reader. The RFID tag may also have a battery, a switch coupling the battery to at least the first transceiver, and a controller that operates the switch in a duty cycle such that power is provided by the battery to the first transceiver during ON times of the duty cycle and such that power from the battery to the first transceiver is interrupted during OFF times of the duty cycle.

35 Claims, 3 Drawing Sheets

U.S. PATENT DOCUMENTS

| | | |
|---|---|---|
| 5,959,568 A | 9/1999 | Woolley |
| 5,962,834 A | 10/1999 | Markman |
| 5,973,598 A * | 10/1999 | Beigel .................... 340/572.1 |
| 6,002,344 A | 12/1999 | Bandy et al. |
| 6,034,603 A | 3/2000 | Steeves |
| 6,050,490 A | 4/2000 | Leichner et al. |
| 6,078,251 A | 6/2000 | Landt et al. |
| 6,091,319 A | 7/2000 | Black et al. |
| 6,107,910 A | 8/2000 | Nysen |
| 6,150,948 A | 11/2000 | Watkins |
| 6,211,781 B1 * | 4/2001 | McDonald ................ 340/505 |
| 6,220,516 B1 * | 4/2001 | Tuttle et al. ............... 235/492 |
| 6,236,315 B1 | 5/2001 | Helms et al. |
| 6,265,963 B1 | 7/2001 | Wood, Jr. |
| 6,269,342 B1 | 7/2001 | Brick et al. |
| 6,317,028 B1 | 11/2001 | Valiulis |
| 6,325,294 B1 * | 12/2001 | Tuttle et al. ............... 235/492 |
| 6,330,971 B1 | 12/2001 | Mabry et al. |
| 6,337,634 B1 | 1/2002 | O'Toole et al. |
| 6,351,630 B1 | 2/2002 | Wood, Jr. |
| 6,353,406 B1 | 3/2002 | Lanzl et al. |
| 6,362,737 B1 | 3/2002 | Rodgers et al. |
| 6,421,426 B1 | 7/2002 | Lucey |
| 6,607,136 B1 * | 8/2003 | Atsmon et al. ............. 235/492 |
| 6,688,527 B1 * | 2/2004 | Knowles et al. ....... 235/472.01 |
| 6,693,511 B1 * | 2/2004 | Seal .......................... 340/10.1 |
| 6,726,099 B1 * | 4/2004 | Becker et al. .............. 235/380 |
| 6,942,156 B1 * | 9/2005 | Ohta et al. .................. 235/492 |
| 2002/0175805 A9 * | 11/2002 | Armstrong et al. ...... 340/10.31 |

FOREIGN PATENT DOCUMENTS

| | | |
|---|---|---|
| WO | WO 99/17230 | 4/1999 |
| WO | WO 99/45761 | 9/1999 |

* cited by examiner

RFID TAG HAVING MULTIPLE TRANSCEIVERS

This application is a divisional application of U.S. application Ser. No. 10/235,564, filed on Sep. 5, 2002, now U.S. Pat. No. 6,726,099, issued Apr. 27, 2004.

TECHNICAL FIELD OF THE INVENTION

The present invention relates to a tag that can be suitably attached to an article and that can be used for RF communications with a tag reader.

BACKGROUND OF THE INVENTION

Various labels have been attached to articles so that the articles can be distinguished one from the other. For example, bar code labels are attached to articles of grocery and are scanned at a check-out counter in order to automatically identify the articles and to register the price of the articles as they are purchased.

Bar code labels have also been used in inventory control and monitoring. Accordingly, these bar codes may be scanned in order to track articles as they move into, through, and out of a storage area. It is also known to read the bar codes attached to articles in order to access various computer records regarding the articles.

Bar code labels, however, have several drawbacks. For example, computer stored records that are accessed when a bar code is read do not move with the corresponding article. Therefore, if the article to which the bar code label is attached is remote from the computer, the records concerning that article cannot be immediately accessed if necessary.

Moreover, bar code labels cannot be read remotely. Thus, if it is desired to take an inventory of articles currently in the storage area, personnel must physically scan each label on each article one at a time in order to determine which articles are presently in the storage area. Such scanning requires the physical presence of the personnel at the location of the articles and is extremely time consuming. Additionally, because bar code labels cannot be read remotely, they cannot be used as security devices that can be detected if the articles to which they are attached are improperly removed from a secured area.

Instead of bar coded labels, it is known to attach radio frequency identification (RFID) tags to the articles to be monitored. The RFID tags can be read, as can bar code labels. However, unlike bar code labels, reading RFID tags does not require the physical presence of personnel because the RFID tags can instead be read remotely. Thus, inventory can be taken more quickly because personnel are not required to walk around a storage area or other area in order to read the RFID tags. Moreover, because RFID tags can be read remotely, they can be used as security devices. Thus, if someone attempts to surreptitiously remove an article to which an RFID tag is attached from a secured area, a remote reader can sense the RFID tag and provide an appropriate alarm.

RFID tags can be read one at a time or in groups. When multiple RFID tags in a group are read at the same time, the information transmitted by the multiple tags frequently collide. Accordingly, spread spectrum techniques, such as either direct sequence spread spectrum (DSSS) or frequency hopping, in the communications between the reader and the tags have been suggested in order to reduce the impact of such collisions. It is also known to interrogate a tag using either a direct sequence spread spectrum (DSSS) signal or a frequency hopping signal.

An RFID tag requires a power source in order to permit the transmission of information from the tag to a reader. Traditionally, an RFID tag is powered either locally or remotely. In remote powering of an RFID tag, the RFID tag typically derives its power from the signal transmitted by the reader. A capacitor or other similar storage device stores the power and supplies the stored power to the processing, memory, and transceiver of the RFID tag. One disadvantage of this powering technique is that, if the RFID tag is operated too far away from the reader, the RFID tag cannot derive sufficient energy from the reader's signal to effectively power its components.

Local powering of the RFID tag usually involves using a battery on the RFID tag in order to power the processing, memory, and transceiver. While the use of a local battery overcomes the disadvantage of operating the RFID tag too far away from the reader when the RFID tag is deriving its power from the reader's signal, the use of a local battery has the disadvantage that it requires frequent replacement or re-charging due to the amount of power consumed by the processing, memory, and transceiver of the RFID tag.

It is known to duty cycle a portion of a receiver of a tag in order to conserve battery power. An example of such a receiver is a super-regenerative receiver. The receiver includes an amplification stage, a local oscillator, a quench frequency source, and a detector stage. The tag also includes a microcontroller, an RF transmitter, and an antenna. The tag remains in a low-power quiescent stand-by state until it is activated by a signal from the reader. Following transmission of an activation signal by the reader, the reader sends a request for information. Specifically, the receiver is duty cycled in order to provide quiescent operation with a low current draw. Thus, some elements of the receiver are completely shut down to save tag power while the tag is operating in a quiescent state. Amplifiers of the receiver utilize forward-biased transistor stages whose forward biasing is provided at the duty cycle rate such that power draw is limited due to the duty cycle of the bias. A duty cycle of 1 to 5% is thought to provide sufficient time for reception of the activation signal and to reduce total current draw.

However, such an arrangement has a number of problems. For example, power consuming elements of the tag and even of the receiver may not be shut down during the OFF times of the duty cycle. Accordingly, power is still wasted. Also, if the transmitter of the tag is capable of using several frequencies specified by the reader, the tag described above cannot quickly acquire the desired frequency for its transmitter and must remain on for a sufficient period of time in order to permit acquisition of that frequency.

Moreover, when a tag is turned off and on in order to conserve battery power, or when the tag is infrequently interrogated by a tag reader, or otherwise, it has periods of OFF time during which it is not or cannot be interrogated by a tag reader. Therefore, interrogations by the tag reader can occur only at widely separated interrogation intervals, thereby allowing an article to which the tag is attached to be removed following one interrogation without anyone realizing it until a succeeding interrogation.

The present invention overcomes one or more of these or other problems.

SUMMARY OF THE INVENTION

In accordance with one aspect of the present invention, a method of communicating information between an RFID tag and first and second readers comprises the following: controlling a first transceiver of the RFID tag so that the first transceiver communicates with the first reader and so that the first transceiver has substantially longer periods during which the first transceiver is not in communication with the first reader than when the first transceiver is in communication with the first reader; and, controlling a second transceiver of the RFID tag so that the second transceiver communicates with the second reader at least during the periods when the first transceiver is not in communication with the first reader.

In accordance with another aspect of the present invention, an RFID tag comprises first and second transceivers. The first transceiver transmits and receives first signals to and from a first reader. The second transceiver transmits and receives second signals to and from a second reader.

In accordance with still another aspect of the present invention, a method is providing to conserve battery power in an RFID tag having a battery, a receiver, and a transmitter. The method comprises the following: duty cycling the receiver so that the receiver is turned on during ON times of duty cycles and so that the receiver is turned off during OFF times of the duty cycles; during the ON times of the receiver, receiving a frequency from a tag reader; and, transmitting data to the reader at the frequency.

In accordance with yet another aspect of the present invention, an RFID tag comprises a transmitter, a receiver, a battery, a switch, and a controller. The transmitter transmits first data to a tag reader. The receiver receives second data from the tag reader. The switch couples the battery to the receiver. The controller operates the switch in a duty cycle such that power is provided by the battery to the receiver during ON times of the duty cycle and such that power from the battery to the receiver is interrupted during OFF times of the duty cycle.

In accordance with a further aspect of the present invention, an RFID tag comprises a transceiver and a receiver. The transceiver transmits and receives first signals to and from a first reader. The receiver receives second signals from a second reader and activates the transceiver thereby causing the transceiver to transmit and receive the first signals to and from the first reader.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
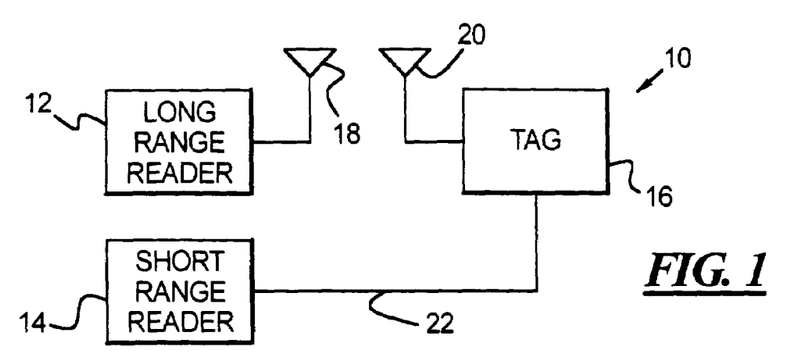
FIG. 1 illustrates a tagging system in accordance with one embodiment of the present invention.

As illustrated in FIG. 1, a tagging system 10 includes a long range reader 12, a short range reader 14, and an RFID tag 16. The long range reader 12 includes an antenna 18, and the RFID tag 16 similarly includes an antenna 20. The antennas 18 and 20 establish a long range RF link between the long range reader 12 and the RFID tag 16 so that the long range reader 12 can remotely read the identification stored in a memory of the RFID tag 16. The range of the long range reader 12 can be as high as several hundred feet or more. For example, the long range reader 12 can have an expected range of approximately 500 feet.

A short range link 22 between the short range reader 14 and the RFID tag 16 permits the short range reader 14 to read information from the RFID tag 16 over a shorter range and/or in a more secure manner. For example, it may not be desirable for the long range reader 12 to read certain information stored in the RFID tag 16 because long range RF communications can be intercepted by a strategically placed surreptitious reader similar to the long range reader 12. Accordingly, the short range link 22 increases the difficulty in illicitly acquiring the more sensitive information that may be stored on the RFID tag 16.

The short range link 22 is shown in FIG. 1 as a hard wire link between the short range reader 14 and the RFID tag 16. Accordingly, the more sensitive information stored on the RFID tag 16 can be read by establishing a physical interconnection between the short range reader 14 and the RFID tag 16.

Alternatively, the short range link 22 may be a limited range magnetic link such as those provided by contact-free smart cards. As a still further alternative, the short range link 22 may be a very limited range RF link. Other alternatives will occur to those skilled in the art. One advantage of using one of these non-hardwired alternatives for the short range link 22 is that then the RFID tag 16 can be more readily used as a security device. Accordingly, when an attempt is made to remove an article to which the RFID tag 16 is attached, the short range reader 14 located at a portal of a secured area or otherwise can pick up a signal from the RFID tag 16 indicating that an attempt is being made to remove the article from the secured area.

The expected maximum range of the short range reader 14 over the short range link 22, for example, may be less than four feet, and is expected, in typical usage, to be between six inches and eighteen inches.

Figure 2:
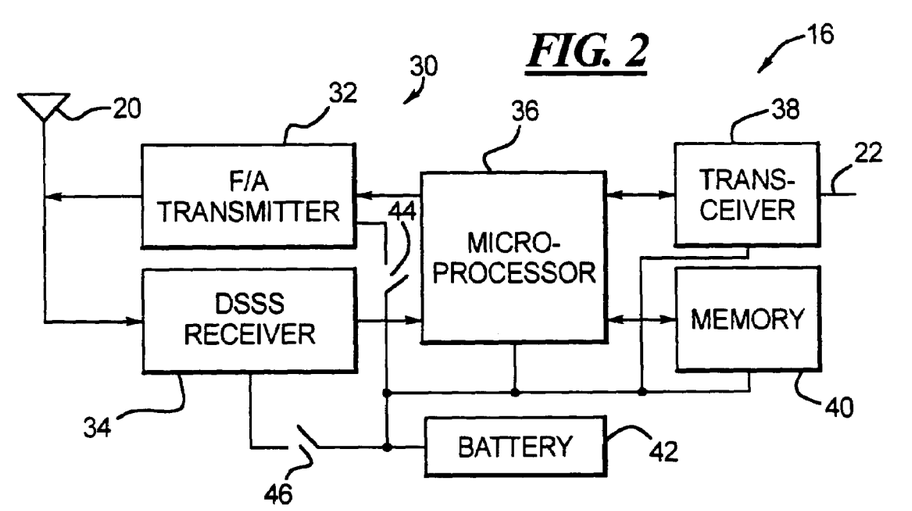
FIG. 2 illustrates additional detail of a tag that can be used with the tagging system of FIG. 1.

An embodiment of the RFID tag 16 is shown in additional detail in FIG. 2. The RFID tag 16 includes a first transceiver 30 comprising a frequency agile (frequency hopping) RF transmitter 32 and a direct sequence spread spectrum RF receiver 34. The frequency agile RF transmitter 32 and the direct sequence spread spectrum RF receiver 34 are coupled between the antenna 20 and a microprocessor 36. Accordingly, the frequency agile RF transmitter 32 of the RFID tag 16 implements frequency hopping in transmitting information to the long range reader 12, and the direct sequence spread spectrum RF receiver 34 of the RFID tag 16 implements direct sequence spread spectrum synchronization and decoding in receiving communications from the long range reader 12.

The RFID tag 16 also includes a second transceiver 38 between the microprocessor 36 and the short range reader 14. Accordingly, the RFID tag 16 can transmit and/or receive communications to and/or from the short range reader 14. In the case where the short range link 22 is a hardwire link, the second transceiver 38 may simply be a plug that is connectible to a corresponding plug of the short range reader 14. In the case where the short range link 22 is an RF link, the second transceiver 38 may be an RF transceiver of any known type provided that this RF transceiver preferably has a much shorter range than the frequency agile RF transmitter 32 and the direct sequence spread spectrum RF receiver 34. In the case where the short range link 22 is a magnetic link, the second transceiver 38 may simply be a magnetic emitter (and/or sensor) capable of magnetically interfacing with the short range reader 14.

The RFID tag 16 further comprises a memory 40 coupled to the microprocessor 36. The memory 40 stores the ID of the RFID tag 16 that can be read by the long range reader 12 through the antennas 18 and 20, the frequency agile RF transmitter 32, the direct sequence spread spectrum RF receiver 34, and the microprocessor 36. The memory 40 may also store information supplied to it by the short range reader 14 through the short range link 22, the second transceiver 38, and the microprocessor 36. The memory 40 can additionally store information supplied by the long range reader 12.

This information can include, for example, the inventory history of the article to which the RFID tag 16 is attached. Accordingly, the date that the article entered inventory, the date that the article left inventory, the length of time that the article has been in inventory, any movement within inventory, and similar information may be stored in the memory 40.

The information stored in the memory 40 may also include shipping manifests that indicate when and to whom the article is to be shipped. Moreover, in the case where individual articles with differing destinations are shipped in the same container, an RFID tag attached to the container, hereafter called a container tag, can be attached to the container. This container tag may be arranged to store the identity and destination of each article in the container. As articles are removed from the container, the information stored in the container tag can be updated to indicate which articles have been removed, the location at which the articles were removed, and the identity of the personnel who removed the articles.

The information stored in the memory 40 may further include maintenance, repair, and date of service records showing the maintenance and/or repair history of the corresponding article.

Other information related to the article may likewise be stored in the memory 40. For example, the integrity of the information stored in the memory 40 can be assured by keeping a record of the modifications to the stored information and of the identity of the personnel making the modifications. As another example, records related to the production of the article may be stored in the memory of the tag.

Accordingly, any information about the article may be stored with the article instead of in a remote computer system or on paper.

Because the records are carried by the RFID tag 16 attached to a corresponding article, the RFID tag 16 eliminates the need to maintain paper or computer records of the life history of an article, the RFID tag 16 eliminates the problem of lost or misplaced records, and the RFID tag 16 improves operational efficiency by eliminating the requirement to retrieve records prior to accessing and/or operating on the article.

The RFID tag 16 includes a battery 42 that is coupled so that it supplies power through a switch 44 to the frequency agile RF transmitter 32, through a switch 46 to the direct sequence spread spectrum RF receiver 34, directly to the microprocessor 36, directly to the second transceiver 38 (if necessary), and directly to the memory 40.

Moreover, a plurality of sensors (not shown) may be coupled to the microprocessor 36. These sensors may include, for example, a temperature sensor, a humidity sensor, and other sensors such as a pressure sensor, a proximity sensor, an electromagnetic sensor, an optical sensor, a mechanical sensor, a chemical sensor, and/or the like. The microprocessor 36 stores the information from the sensors in the memory 40, and this information may be read from the memory 40 by the short range reader 14 or by the long range reader 12.

The microprocessor 36 may be arranged to further sense the voltage level of the battery 42. Accordingly, the microprocessor 36 stores this voltage level in the memory 40, and this stored voltage level may be read from the memory 40 by the short range reader 14 or by the long range reader 12. Thus, if the voltage level of the battery 42 as read by either the short range reader 14 or the long range reader 12 indicates that the battery 42 needs charging or replacement, suitable remedial action may be taken.

Because of the frequency agile RF transmitter 32, the direct sequence spread spectrum RF receiver 34, and/or the battery 42, the RFID tag 16 is capable of relatively long range activation while providing a low power method for command-response activation by the long range reader 12. This long range activation allows the RFID tag 16 to be placed at distances remote from the long range reader 12 for purposes of interrogating the RFID tag 16 for its unique tag number and possibly other information.

The frequency agile RF transmitter 32 and the direct sequence spread spectrum RF receiver 34 allow the tagging system 10 to operate in the FCC defined Industrial Scientific and Medical (ISM) bands at maximum legal power. Both frequency hopping as used by the frequency agile RF transmitter 32 and direct sequence spread spectrum communications as used by the direct sequence spread spectrum RF receiver 34 circumvent jamming by narrow-band signals using different methods of spreading the signal over a large bandwidth. The direct sequence spread spectrum RF receiver 34 can receive signals from the long range reader 12 within milliseconds of activation. By contrast, a frequency agile receiver must search a long frequency hopping sequence in order to receive signals from the long range reader 12. The time required to make this search is typically longer than the time required to detect a direct spread spectrum sequence because the direct spread spectrum signal is either on a fixed frequency or on one of only a few frequencies.

Also, the RFID tag 16 may be duty cycled in order to conserve the energy stored in the battery 42. Thus, each duty cycle has an ON time and an OFF time. During the ON time, the RFID tag 16 is fully powered permitting the direct sequence spread spectrum RF receiver 34 to receive communications directed to the RFID tag 16 and to permit the frequency agile RF transmitter 32 to transmit information to in response to the communications. During the OFF time, all non-essential power consuming devices of the RFID tag 16, such as the frequency agile RF transmitter 32 and/or the direct sequence spread spectrum RF receiver 34, are effectively disconnected from the battery 42 so that energy drainage of the battery 42 is reduced. The OFF time to ON time ratio of the duty cycle, for example, may be on the order of 1000:1, although other ratios could be used.

Figure 3:
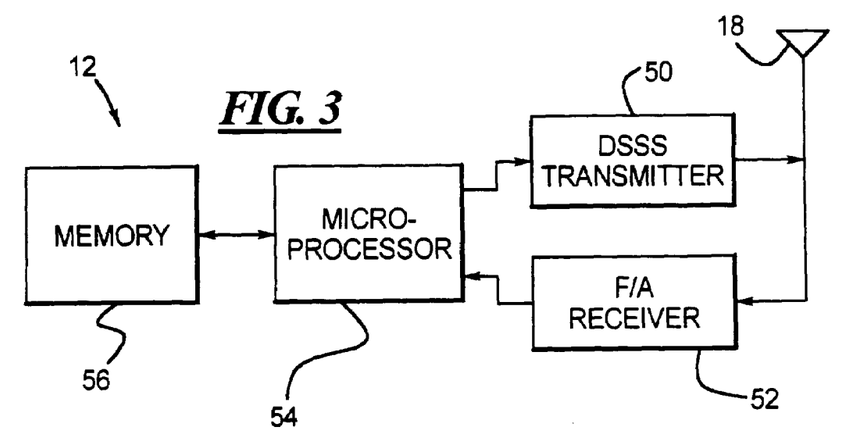
FIG. 3 illustrates additional detail of a long range reader that can be used with the tagging system of FIG. 1.

An embodiment of the long range reader 12 is shown in additional detail in FIG. 3. The long range reader 12 includes a direct sequence spread spectrum RF transmitter 50 and a frequency agile RF receiver 52 coupled between the antenna 18 and a microprocessor 54. The frequency agile RF receiver 52 of the long range reader 12 implements frequency hopping in receiving information from the frequency agile RF transmitter 32 of the RFID tag 16. Moreover, the direct sequence spread spectrum transmitter 50 of the long range reader 12 implements direct sequence spread spectrum transmission in transmitting communications to the direct sequence spread spectrum RF receiver 34 of the RFID tag 16.

The long range reader 12 further comprises a memory 56 coupled to the microprocessor 36. The memory 56 stores the information that the long range reader 12 receives from the RFID tag 16. The memory 56 also stores the software that supports a communication protocol as described herein.

Figure 4:
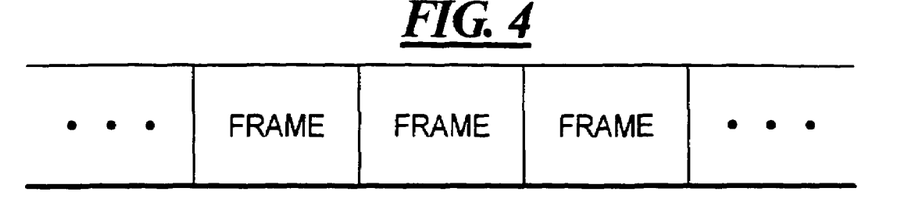
FIG. 4 illustrates a message format useful in supporting communications between the tag and the reader of FIG. 1.

This communication protocol governs the message format that is used between the long range reader 12 and the RFID tag 16. According to this protocol, a message is comprised of a plurality of frames as shown in FIG. 4. Each frame is preferably no longer than the length of time the frequency agile RF transmitter 32 is allowed to dwell at any given frequency.

Figure 5:
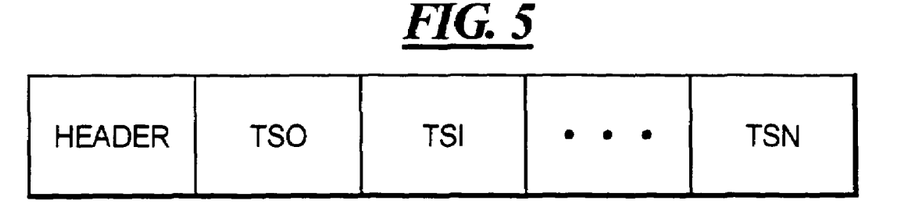
FIG. 5 illustrates an exemplary composition of a frame of the message format shown in FIG. 4.
Figure 6:
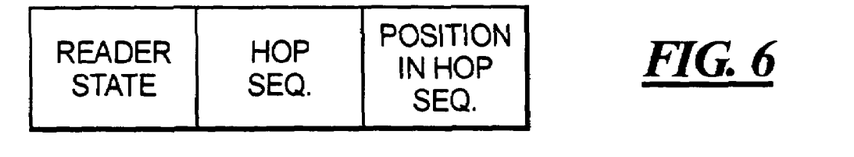
FIG. 6 illustrates an exemplary composition of the header of the frame shown in FIG. 5.

Each of the frames shown in FIG. 4 has the construction shown in FIG. 5. Accordingly, each frame has a frame header and a number of time slots TS0–TSN. The frame header contains information about the long range reader 12 that is reading the RFID tag 16. As shown in FIG. 6, the header contains (i) the state of the long range reader 12, (ii) the hop sequence currently being used by the long range reader 12 to receive messages from the RFID tag 16, and (iii) the current position (i.e., frequency) of the long range reader 12 in this hop sequence. The frame header can also contain such other information as may be useful in the tagging system 10. For example, the frame header may also contain the number (N+1) of the time slots in the corresponding frame.

The long range reader 12 may have several reader states including, for example, an active communication state and a beacon state. In the active communication state, the long range reader 12 commands responses from one or more selected tags such as the RFID tag 16. In the beacon state, the tags, such as the RFID tag 16, self-initiate the transmission of messages to the long range reader 12.

The hop sequence and/or the current position in the hop sequence as contained in the frame header are/is useful to tags that have limited signal processing capability. Such tags, for example, may have no capability themselves to determine the frequency (i.e., the current position in the hop sequence) onto which they should transmit their responses.

Figure 7:
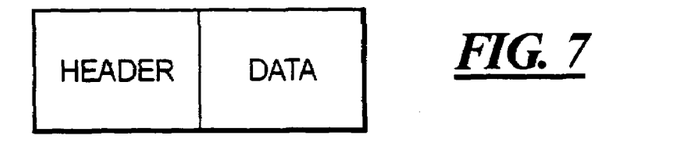
FIG. 7 illustrates an exemplary composition of a time slot of the frame shown in FIG. 5.
Figure 8:
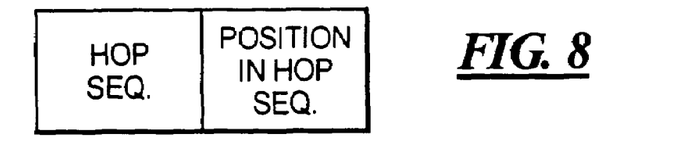
FIG. 8 illustrates an exemplary composition of the header of the time slot shown in FIG. 6; and, FIGS. 9, 10, and 11 are flow charts showing an exemplary operation of the tag illustrated in FIGS. 1 and 2.

Moreover, each time slot may also include a time slot header and data as shown in FIG. 7, and each time slot header, as shown in FIG. 8, may contain the hop sequence and the current position in the hop sequence of the long range reader 12. The time slot header may also contain the relative position, such as a time slot number (0, 1, . . . , or N), of the corresponding time slot in the frame. This relative position information may be used by the RFID tag 16 to establish a relative timing interval into which the RFID tag 16 can transmit data. By transmitting the hop sequence and the current position in the hop sequence at the beginning of each time slot, the RFID tag 16 is aided in its rapid acquisition of the current hop sequence and frequency. Because the RFID tag 16 can acquire, from the header in each time slot, sufficient information about the frequency and timing of the long range reader 12, the RFID tag 16 may power down until such time that it expects the complete header information to be transmitted by the long range reader 12. Therefore, the RFID tag 16 is able to substantially reduce the amount of power that it uses to determine the frequency and timing to be used by its frequency agile RF transmitter 32 in transmitting information in the data portion of the time slot.

As indicated above, the long range reader 12 transmits all headers, whether frame headers or time slot headers. The RFID tag 16 transits only in the data portion of the time slots. The RFID tag 16 may implement a non-deterministic method of selecting a time slot for the transmission of data. By using a non-deterministic method of selecting a time slot, the possibility of a plurality of tags transmitting data into the same time slot is minimized. For purposes of illustration, such a non-deterministic method of selecting a time slot could be embodied by a pseudo-random number generator that pseudo-randomly generates a number of a time slot into which its corresponding tag transmits its data. This implementation results in a communications protocol similar to, but not identical to, the Aloha protocol, a standard communications protocol.

The long range reader 12 can communicate directly with a specific tag or a group of specific tags. When the long range reader 12 is communicating directly with a specific tag or a group of specific tags, the long range reader 12 may suspend the transmission of time slot headers. This suspension indicates to all other tags that their communications are to be suspended. Also, all data may be transmitted between the long range reader 12 and the RFID tag 16 in packets having packet numbers so that both the long range reader 12 and the RFID tag 16 can detect missing or duplicate data. Moreover, acknowledgements can be used to signify a successful transmission between the long range reader 12 and the RFID tag 16. A failure to receive an acknowledgement can cause re-transmission of the information. Once a transaction between the long range reader 12 and a specific tag or group of tags is complete, the long range reader 12 resumes transmitting the headers.

As discussed above, the RFID tag 16 may be duty cycled such that, during ON times, the RFID tag 16 can receive interrogations from the long range reader 12 and such that, during OFF times, the RFID tag 16 cannot receive interrogations from the long range reader 12. Alternatively, the long range reader 12 may infrequently interrogate the RFID tag 16. Thus, during the OFF portions of the duty cycles, and/or during the long periods between interrogations by the long range reader 12, an article to which the RFID tag 16 is attached can be removed without authorization from a secured area, and the long range reader 12 may not detect this unauthorized removal of the article in sufficient time to stop it.

However, the presence of the second transceiver 38 enables the RFID tag 16 to be immediately activated when the RFID tag 16 is brought into the short range of the short range reader 14. The short range reader 14, for example, may be located at an appropriate activation portal (typically installed at an entryway). In this case, the short range reader 14 can be arranged to emit an interrogation signal that is read by the RFID tag 16 through the second transceiver 38. The RFID tag 16 sends a response to the interrogation signal through the second transceiver 38 in order to indicate that the RFID tag 16 is within the range of the short range reader 14. Therefore, an appropriate alarm can be given in sufficient time to prevent the unauthorized removal of the article.

Alternatively, a portal may be arranged to interrogate the RFID tag 16 and the RFID tag may be arranged to transmit a response through the second transceiver 38 to the short range reader 14 that is located elsewhere than at the portal.

As a further alternative, a portal may be arranged to interrogate the RFID tag 16 and the RFID tag 16 may be arranged to wake up the first transceiver 30 causing the first transceiver 30 to transmit a response through to the long range reader 12 that is located remotely from the portal. As a still further alternative, the portal and/or the short range reader 14 may passively receive a signal from the second transceiver 38 of the RFID tag 16 in order to indicate that the RFID tag 16 is within the range of the portal and/or the short range reader 14.

Figures 9, 10, 11:
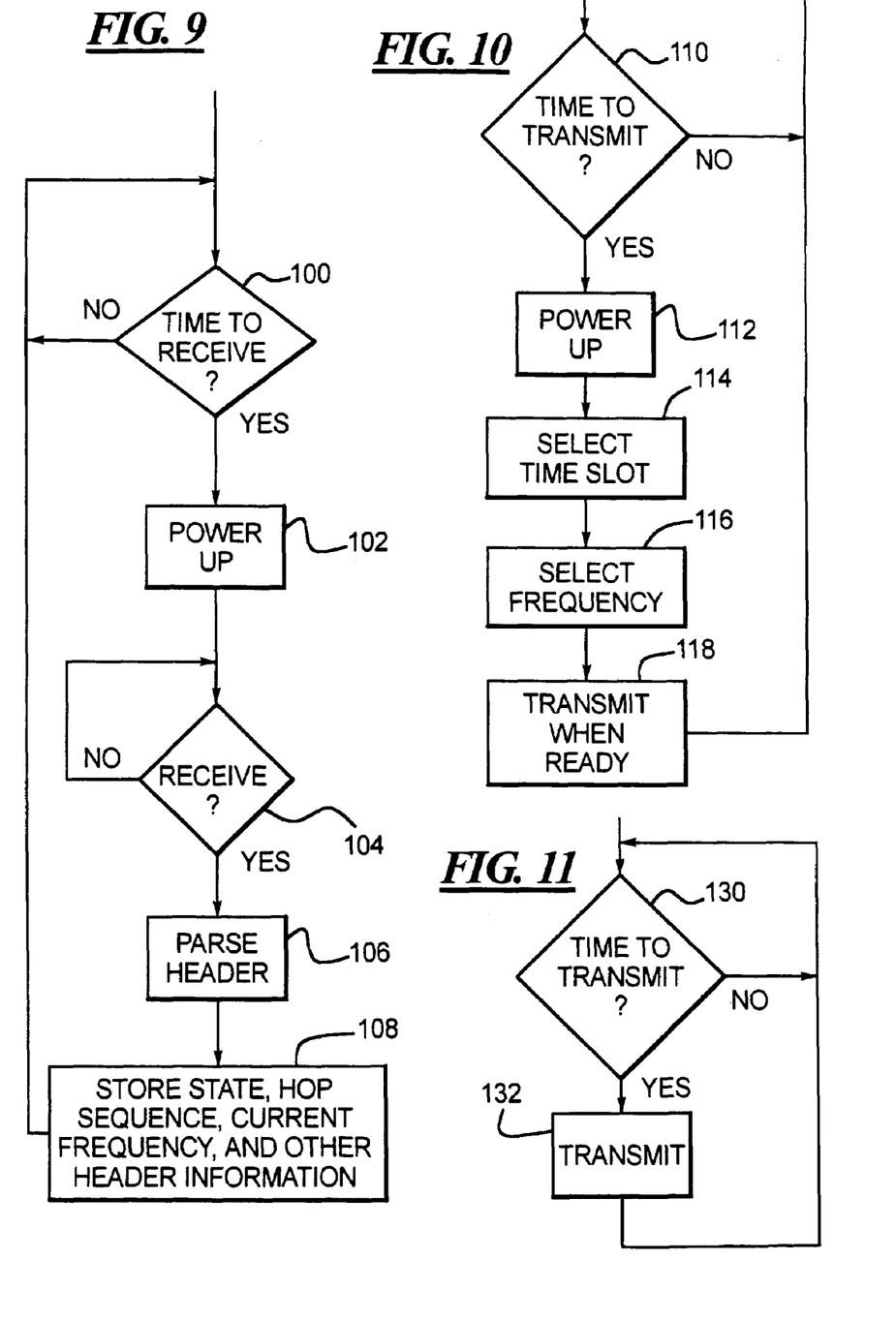

As shown in FIG. 9, when it is time for the RFID tag 16 to receive messages from the long range reader 12, as indicated by a block 100, the RFID tag 16 powers up, as indicated by a block 102. Accordingly, power is supplied to the direct sequence spread spectrum RF receiver 34 so that it can then listen for a message from the long range reader 12. To power up the direct sequence spread spectrum RF receiver 34, the microprocessor 36 may simply close the switch 46 to couple the battery 42 to the direct sequence spread spectrum RF receiver 34. The microprocessor 36 controls the duty cycle of the switch 46 so that it has an appropriate OFF to ON ratio, such as the 1000:1 duty cycle ratio described above.

When the RFID tag 16 detects a received message at the direct sequence spread spectrum RF receiver 34 as indicated by a block 104, the RFID tag 16 parses the header information as indicated by a block 106 and, as indicated by a block 108, stores the reader state, the hop sequence, the current position in the hop sequence, and any other information that is contained in the header.

As shown in FIG. 10, when it is time for the RFID tag 16 to transmit data to the long range reader 12 as indicated by a block 110, the RFID tag 16 powers up, as indicated by a block 112. Accordingly, power is supplied to the frequency agile RF transmitter 32 so that it can then transmit data to the long range reader 12. To power up the frequency agile RF transmitter 32, the microprocessor 36 may close the switch 44 to couple the battery 42 to the frequency agile RF transmitter 32. The microprocessor 36 controls the duty cycle of the switch 44 so that it has an appropriate OFF to ON ratio such as the 1000:1 ratio described above. Thereafter, the RFID tag 16 selects the time slot in which it is to transmit the data as indicated by a block 114, the RFID tag 16 selects the frequency at which it is to transmit the data as indicated by a block 116, and the RFID tag 16 causes the frequency agile RF transmitter 32 to transmit the data in the selected time slot using the selected frequency as indicated by a block 118.

The time at which the RFID tag 16 is to transmit data (the block 106) depends on the state of the long range reader 12. If the reader state as contained in the header and stored by the RFID tag 16 (block 104) indicates that the long range reader 12 is in the beacon mode, the RFID tag 16 self-originates the transmission of data. In this state, the RFID tag 16, for example, may be arranged to transmit data periodically based on a timer. When the timer indicates that it is time to transmit, the RFID tag 16 starts at the block 100 so that the direct sequence spread spectrum RF receiver 34 can determine the frequency at which the frequency agile RF transmitter 32 is to transmit and processing continues through the remainder of the blocks shown in FIGS. 9 and 10. In the case where the RFID tag 16 is in the beacon mode, the block 110 may be a simple pass through to the block 112.

If the long range reader 12 is an active communication state, the RFID tag 16 at the block 110 determines whether an interrogation signal for the RFID tag 16 has been received.

Other reader states for the long range reader 12 are also possible.

As indicated above, the time slot in which the RFID tag 16 transmits data may be selected based on the pseudo-randomly generated number. The frequency at which the RFID tag 16 transmits data is selected based on the current position in the hop sequence as parsed (block 106) and stored (block 108) by the RFID tag 16.

The protocol as described above facilitates a long duty cycle and/or infrequent interrogations by the long range reader 12 because the RFID tag 16 can quickly receive the necessary information (such as hopping frequency) to permit it to transmit data.

As shown in FIG. 11, when it is time for the RFID tag 16 to transmit data to the short range reader 14 (or portal) as indicated by a block 130, the second transceiver 38 of the RFID tag 16 transmits the appropriate information as indicated by a block 132.

The time at which the RFID tag 16 transmits data to the short range reader 14 (or portal) and the data to be transmitted may be in accordance with any of the embodiments and/or alternatives described above. For example, if the RFID tag 16 receives a signal from the short range reader 14 requesting information stored in the memory 40, it is time to transmit, and the second transceiver 38 transmits the requested information to the short range reader 14. As another example, when the RFID tag 16 is being used as a security device, the RFID tag 16 responds to an interrogation signal from the short range reader 14 or a portal (time to transmit) by sending a signal to the short range reader 14, portal, or long range reader 12 indicating that the RFID tag 16 is within the range of the short range reader 14 or portal.

Certain modifications of the present invention have been disclosed above. Other modifications will occur to those practicing in the art of the present invention. For example, the functions of the long range reader 12 as described above have been confined to reading information from the RFID tag 16. However, the long range reader 12 can also be arranged to write information to the RFID tag 16.

Also, as described above, the long range reader 12 is arranged to read the tag ID of the RFID tag 16, and the short range reader 14 is arranged to read other information from the RFID tag 16. However, the long range reader 12 may be arranged instead to read any combination of tag ID and other information from the RFID tag 16, and the short range reader 14 may be similarly arranged to read any combination of the tag ID and other information from the RFID tag 16.

Moreover, although the RFID tag 16 is shown as a microprocessor based tag in FIG. 2, the RFID tag 16 may instead comprise one or more digital circuit elements, and/or a programmable logic array, and/or a dedicated integrated circuit, etc.

Furthermore, the long range reader 12 as described above has a range of several hundred feet and could have an expected range of approximately 500 feet. However, this range could be longer or shorter depending on the application and/or other factors. Similarly, the range given above for the short range reader 14 could be other than as described above.

Additionally, the transmitter of the first transceiver 30 of the RFID tag 16 is described above as the frequency agile RF transmitter 32, and the receiver of the first transceiver 30 of the RFID tag 16 is described above as the direct sequence spread spectrum RF receiver 34. However, the RFID tag 16 may instead advantageously use other types of transmitters and receivers.

Also, the frequency agile RF transmitter 32 and the direct sequence spread spectrum RF receiver 34 are duty cycled as described to conserve the energy of the battery 42. Additionally, the microprocessor 36 may also power itself down during the OFF portion of the duty cycle of the RFID tag 16 requiring only the power necessary to determine the ON portion of the duty cycle.

Moreover, as described above, one or more elements of the RFID tag 16, such as the direct sequence spread spectrum RF receiver 34, may be duty cycled. The duty cycles can have equal or unequal ON times and/or equal or unequal OFF times.

Furthermore, the switches 44 and 46 described above may be electromechanical switches, semiconductor switches, logic elements, etc.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. An RFID tag comprising:
   a first transceiver arranged to transmit and receive first radio frequency signals to and from a first reader; and,
   a second transceiver arranged to transmit and receive second radio frequency signals to and from a second reader.

2. The RFID tag of claim 1 wherein the second signals are of a nature that excludes reception by the first reader, and wherein the first signals are of a nature that excludes reception by the second reader.

3. The RFID tag of claim 1 wherein the first transceiver comprises a frequency agile transmitter and a direct sequence spread spectrum receiver.

4. The RFID tag of claim 1 wherein the first transceiver comprises a long range RF transceiver, and wherein the second transceiver comprises a short range RF transceiver.

5. The RFID tag of claim 4 wherein the first transceiver comprises a frequency agile transmitter and a direct sequence spread spectrum receiver.

6. The RFID tag of claim 1 wherein the second transceiver comprises a hardwire interface.

7. The RFID tag of claim 1 wherein the second transceiver comprises a magnetic interface.

8. The RFID tag of claim 1 wherein the first transceiver comprises a duty cycled receiver and a transmitter.

9. The RFID tag of claim 8 wherein the duty cycled receiver comprises a duty cycled direct sequence spread spectrum RF receiver, and wherein the transmitter comprises a frequency agile RF transmitter.

10. The RFIID tag of claim 1, wherein the first transceiver comprises a duty cycled receiver and a duty cycled transmitter.

11. The RFID tag of claim 10 wherein the duty cycled receiver comprises a duty cycled direct sequence spread spectrum RF receiver, and wherein the duty cycled transmitter comprises a duty cycled frequency agile RF transmitter.

12. The RFID tag of claim 1 wherein the first transceiver is arranged to transmit data in a time slot pseudorandomly selected by the RFID tag.

13. An RFID tag comprising:
    a transceiver arranged to transmit and receive first radio frequency signals to and from a first reader; and,
    a receiver arranged to receive second radio frequency signals from a second reader and to activate the transceiver in response to the second signals.

14. The RFID tag of claim 13 wherein the second signals are of a nature that excludes reception by the first reader, and wherein the first signals are of a nature that excludes reception by the second reader.

15. The RFID tag of claim 13 wherein the transceiver comprises a frequency agile transmitter and a direct sequence spread spectrum receiver.

16. The RFID tag of claim 13 wherein the transceiver comprises a long range RF transceiver, and wherein the receiver comprises a short range receiver.

17. The RFID tag of claim 16 wherein the transceiver comprises a frequency agile transmitter and a direct sequence spread spectrum receiver.

18. The RFID tag of claim 13 wherein the receiver comprises a hardwire interface.

19. The RFID tag of claim 13 wherein the receiver comprises a magnetic interface.

20. The RFID tag of claim 13 wherein the transceiver comprises a duty cycled receiver and a transmitter.

21. The RFID tag of claim 20 wherein the duty cycled receiver comprises a duty cycled direct sequence spread spectrum RF receiver, and wherein the transmitter comprises a frequency agile RF transmitter.

22. The RFID tag of claim 13 wherein the transceiver comprises a duty cycled receiver and a duty cycled transmitter.

23. The RFID tag of claim 22 wherein the duty cycled receiver comprises a duty cycled direct sequence spread spectrum RF receiver, and wherein the duty cycled transmitter comprises a duty cycled frequency agile RF transmitter.

24. The RFID tag of claim 13 wherein the transceiver is arranged to transmit data in a time slot pseudorandomly selected by the RFID tag.

25. An RFID tag comprising:
    a transceiver arranged to transmit and receive first radio frequency signals to and from a first reader; and,
    a receiver arranged to receive second radio frequency signals from a second reader and to activate the transceiver in response to the second signals wherein the receiver is incapable of receiving the first signals.

26. The RFID tag of claim 25 wherein the second signals are of a nature that excludes reception by the first reader, and wherein the first signals are of a nature that excludes reception by the second reader.

27. The RFID tag of claim 25 wherein the transceiver comprises a frequency agile transmitter and a direct sequence spread spectrum receiver.

28. The RFID tag of claim 24 wherein the transceiver comprises a long range RF transceiver, and wherein the receiver comprises a short range receiver.

29. The RFID tag of claim 28 wherein the transceiver comprises a frequency agile transmitter and a direct sequence spread spectrum receiver.

30. The RFID tag of claim 25 wherein the receiver comprises a hardwire interface.

31. The RFID tag of claim 25 wherein the receiver comprises a magnetic interface.

32. The RFID tag of claim 25 wherein the transceiver comprises a receiver and a transmitter.

33. The RFID tag of claim 25 wherein the transceiver comprises a duty cycled receiver and a duty cycled transmitter.

34. The RFID tag of claim 33 wherein the duty cycled receiver comprises a duty cycled direct sequence spread spectrum RF receiver, and wherein the duty cycled transmitter comprises a duty cycled frequency agile RF transmitter.

35. The RFID tag of claim 25 wherein the transceiver is arranged to transmit data in a time slot pseudorandomly selected by the RFID tag.

* * * * *